UNITED STATES PATENT OFFICE 2,540,071

ALLYLIC REARRANGEMENT

Willard J. Croxall, Bryn Athyn, and John O. Van Hook, Philadelphia, Pa., assignors to Rohm & Haas Company, Philadelphia, Pa., a corporation of Delaware No Drawing. Application January 21, 1949, Serial No. 72,076

9 Claims. (Cl. 260—484)

This invention concerns 2-hydroxymethylene-4-pentenoic acids and their esters. It relates further to the process by which they are prepared.

According to this invention compounds of the formula $$R^1CH=C(R^2)CH_2OCH=CHCOOR$$

are heated at 150° to 250° C. and thereby rearranged to new esters of 2-hydroxymethylene-4-pentenoic acids of the formula

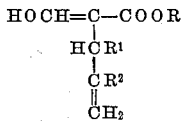

which on hydrolysis yield the corresponding acids. These 2-hydroxymethylene compounds are the enol form of the aldehydo-compounds,

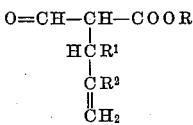

In the above formulae R is the hydrocarbon residue of a non-tertiary alcohol, ROH, and may be an alkyl group, a cycloalkyl group, or an aralkyl group, such as methyl, ethyl, propyl, butyl, isobutyl, sec.-butyl, amyl, hexyl, 2-ethylbutyl, heptyl, isoheptyl, octyl, capryl, 2-ethylhexyl, cyclopentyl, cyclohexyl, methylcyclohexyl, benzyl, methylbenzyl, or the like. The group R may also be an unsaturated aliphatic hydrocarbon group such as allyl, 2-methallyl, 2-ethallyl, 2-butallyl, crotyl, 3-ethallyl, or 3-butallyl or an arylaliphatic group such as cinnamyl or beta-phenallyl. It is preferably, however, a saturated hydrocarbon group and contains not over eight carbon atoms.

The groups $R^1$ and $R^2$ represent hydrogen, chlorine, bromine, methyl, ethyl, propyl, butyl, or phenyl. It is preferred that for any specific compound at least one of the groups $R^1$ and $R^2$ is hydrogen. Both $R^1$ and $R^2$ may be hydrogen, as in the allyl group, but, when one group is hydrocarbon or halogen, the other is preferably hydrogen.

The above-defined new esters and their acids are reactive substances and serve as intermediates for the preparation of compounds, some of which are old and some new. When the esters are heated at about 150° C. to 250° C. with an anhydrous alkali, such as an alkali metal alcoholate, they are decarbonylated to esters of 4-pentenoic acids,

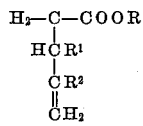

from which the free acid is derived through hydrolysis or saponification.

Acylation of the 2-hydroxymethylene group yields diesters,

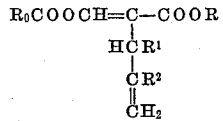

This change is conveniently accomplished with a monocarboxylic acid anhydride, such as acetic anhydride, propionic anhydride, or butyric anhydride. Other acid anhydrides, including phthalic, maleic, and the like, also react.

Hydrolysis or saponification of the esters of 2-hydroxymethylene-4-pentenoic acids leads to the free acid or salt. When the acid is heated at 150° C. to 250° C., it is decarboxylated to yield the unsaturated aldehyde $$OCHCH_2CH(R^1)C(R^2)=CH_2$$

Reaction of the esters of 2-hydroxymethylene-4-pentenoic acids with carbamides and thiocarbamides leads to uracils and thiouracils.

The starting esters for the process of this invention are available through several sources. As shown in application Serial No. 52,607, filed by Croxall and Schneider on October 2, 1948, acetylene reacts with an ester of carbonic acid and a non-tertiary alcohol in the presence of anhydrous, strongly alkaline catalyst to form beta-ether acrylates and beta,beta-diether propionates. When diallyl carbonate, for example, is used, there are obtained allyl beta-alloxyacrylate and allyl beta,beta-di(alloxy)propionate. Other 2,3-unsaturated alcohol residues may be used in the place of the allyl group.

The unsaturated ether esters need not, however, be thus directly prepared. The starting carbonate ester may be that of a lower saturated aliphatic alcohol, such as dimethyl carbonate, diethyl carbonate, dipropyl carbonate, dibutyl carbonate, dihexyl carbonate, or dioctyl carbonate. These yield with acetylene in the presence of the alkaline catalysts corresponding alkyl beta-alkoxyacrylates and beta,beta-dialkoxypropionates. When these are heated with a 2,3- unsaturated alcohol in the presence of an alkaline catalyst, the groups from lower boiling alcohols are displaced by a higher boiling unsaturated alcohol, as described in U. S. application Serial No. 52,601, filed by Croxall and Van Hook on October 2, 1948.

It is not necessary, however, to replace both ether and ester group. The alkyl group completing the ether function is replaced when a beta-ether acrylate or beta,beta-diether propionate is heated with a 2,3-unsaturated alcohol in the presence of a mildly acidic catalyst, such as an alkali metal acid sulfate There is taken from the reaction mixture the alcohol corresponding to the alkyl group and, when an amount of such alcohol as is equivalent to the ether group has been removed, the reaction is interrupted. In this way ether esters of the formula

R'OCH=CHCOOR and (R'O)₂CHCH₂COOR are obtained, as is more fully described in U. S. application Serial No. 52,602, filed by Croxall and VanHook on October 2, 1948. R' is used to designate the olefinically unsaturated group introduced.

The beta,beta-diether propionates are converted to beta-ether acrylates when the former are heated in the presence of a dealcoholating catalyst, such as an alkali metal acid sulfate or an alkali, and a mole of alcohol taken off per mole of ester. This process is described in detail in U. S. application Serial No. 52,608, filed by Croxall and Schneider on October 2, 1948. By this process a diether ester, such as ethyl di(ethoxy)propionate is converted to ether acrylate, ethyl beta-ethoxyacrylate, or allyldialkoxypropionate to allyl alloxyacrylate.

In place of the allyl group proper, there may be introduced other allylically unsaturated group, particularly a hydrocarbon group or halohydrocarbon group; i. e., a 2,3-unsaturated group. The preferred unsaturated groups are allyl, 2-methallyl, 2-ethallyl, 2-propallyl, 2-butallyl, 2-phenallyl, 2-chloroallyl, 2-bromoallyl, 3-methallyl(crotyl), 3-ethallyl, 3-propallyl, 3-butallyl, and 3-phenallyl(cinnamyl). These are residues of alcohols of the formula

R¹CH=C(R²)CH₂OH

The most convenient and economical method for introducing one of these groups is through transetherification of an alkyl beta-alkoxyacrylate or beta,beta-dialkoxypropionate in which the alkyl groups do not exceed eight carbon atoms, by the reactions described above. A mixture of alkyl beta-alkoxyacrylates and beta,beta-dialkoxypropionates may be used as well as the individual ether esters. There are thus obtained compounds of the formula

R¹CH=C(R²)CH₂OCH=CHCOOR where R under these conditions is an alkyl group of not over eight carbon atoms, particularly an alkyl group of one to four carbon atoms, and R¹ and R² have the significance described above. It is desirable that during transetherification the reaction temperature be maintained below 150° C. if the above compounds are to be isolated. The stripping of the alcohol, ROH, is advantageously accomplished under reduced pressure.

One may thus start with an ester (RO)₂CO of carbonic acid and of a saturated monohydric alcohol, ROH, where R is a non-tertiary alkyl group, particularly one of not over eight carbon atoms and preferably one of not over four carbon atoms. By reaction thereof with acetylene at 20° C. to 110° C. in the presence of a strongly alkaline catalyst, such as an alkali metal acetylide, an alkali metal alcoholate, or a strongly basic quaternary ammonium alkoxide, there are obtained such acrylates as methyl beta-methoxyacrylate, ethyl beta-ethoxyacrylate, propyl beta-propoxyacrylate, butyl beta-butoxyacrylate, hexyl beta-hexoxyacrylate, or octyl beta-octoxyacrylate, or such propionates as methyl beta,beta-dimethoxypropionate, ethyl beta,beta-diethoxypropionate, butyl beta,beta-dibutoxypropionate, or octyl beta,beta-dioctoxypropionate, or mixtures of ether acrylate and diether propionate. Along with these there may be obtained ether maleates and diether succinates.

When acetylene is no longer absorbed by the reaction mixture, the catalyst is destroyed, as with acid, and the reaction mixture separated by distillation. A fraction containing ether acrylate and propionate may be taken off. This may be heated, desirably under reduced presusre, with an alkali metal acid sulfate and the propionate decomposed to acrylate. Alternatively, the mixture may be directly used.

The ether acrylate or the mixture may then be transetherified by heating it with a beta,gamma-unsaturated alcohol, such as allyl, 2-chloroallyl, 2-bromoallyl, 2-methallyl, 2-ethallyl, 2-butallyl, crotyl, or cinnamyl alcohols or 2-penten-1-ol, 2-hexen-1-ol, or the like. A mildly acidic catalyst is used at concentrations of 0.01% to 1% of the weight of the ether ester. The alcohol, ROH, is displaced at temperatures between 75° C. to 150° C. at normal or reduced pressures. This permits isolation of the ester R'OCH=CHCOOR(or R')

where R' is the unsaturated group introduced.

This product is then heated at 150° C. to 250° C., preferably 150° C. to 200° C., and is thereby rearranged. The resulting ester of 2-hydroxymethylene-4-pentenoic acid is separated.

Alternatively, the alkyl beta-ether acrylate or propionate of mixture thereof is heated to 150° C. to 250° C. in the presence of an alkali metal acid sulfate with a beta,gamma-unsaturated alcohol, R'OH, where R' is a beta,gamma-olefinically unsaturated residue. Transetherification and rearrangement are caused in the reaction mixture. The displaced alcohol is distilled off, the catalyst is destroyed, and the rearranged product worked up.

Similarly, an alkyl beta-ether acrylate is heated to 150° C. or more with a beta,gamma-unsaturated alcohol in the presence of an alkaline catalyst. Transetherification and transesterification now both take place accompanied by rearrangement of one of the unsaturated groups introduced from the beta,gamma-unsaturated alcohol. Under these conditions there can be isolated not only transetherified and transesterified acrylates but also 2-hydroxymethylene-4-pentenoates and 4-pentenoates. The hyroxy compounds result by rearrangement, while the last result from the decarbonylation of the 2-hydroxymethylene-4-pentenoates by heating in the presence of alkali. It is thus possible to utilize the 2-hydroxymethylene-4-pentenoate esters without actually isolating them.

Typical preparations of the 2-hydroxymethylene-4-pentenoic acid esters and the products derivable therefrom are presented in the following illustrative examples.

EXAMPLE 1

*(a) Preparation of ethyl beta-alloxyacrylate*

A mixture of 144 grams of ethyl beta-ethoxyacrylate, 174 grams of allyl alcohol, and 0.1 gram of sodium hydrogen sulfate was heated in a reaction vessel carrying a distillation column. After a short period of heating there was evolved ethyl alcohol which was taken off at an overhead temperature of 78°–79° C. with a pot temperature of about 100° C. The pot temperature gradually rose to 120' C. while there were taken off 41 grams of ethyl alcohol and then 21 grams of a mixture of ethyl alcohol and allyl alcohol, the latter distilling at 80° to 94° C. The reaction mixture was then subjected to distillation under reduced pressure. A fraction distilling at 25° to 40° C./22 mm. was identified as allyl alcohol. Between 51° and 68° C./3 mm. a mixture of allyl alcohol and ethyl beta-alloxyacrylate was taken off. Then, the main fraction of ethyl beta-alloxyacrylate was distilled at 65°–72° C./2–3 mm. It had a refractive index, $n_D^{20}$, of 1.4635. The next fraction distilled at 69°–77° C./2 mm., had a refractive index of 1.4724, and consisted of a mixture of ethyl beta-alloxyacrylate and allyl beta-alloxyacrylate.

The main fraction was redistilled at 73° C./3 mm. The product thus obtained had a refractive index of 1.4640 and a saponification equivalent of 157. The theoretical saponification equivalent for ethyl beta-alloxyacrylate is 156.

*(b) Rearrangement of ethyl beta-alloxyacrylate to ethyl 2-hydroxymethylene-4-pentenoate*

Pure ethyl beta-alloxyacrylate, prepared as described immediately above, was taken in an amount of 312 grams. Thereto was added 5 grams of beta-naphthol and the mixture was heated at 150° C. (±5° C.) for two hours with stirring. This mixture was then cooled to 10° C. and stirred at 10° C. for one-half hour with a solution of 80 grams of sodium hydroxide in 500 ml. of water. The resulting mixture was then allowed to stand. Two layers formed and were separated. The lower aqueous layer was shaken with ether and the ether extract was added to the organic layer. The latter was then dried over potassium carbonate and distilled. Therefrom was recovered 43 grams of ethyl beta-alloxyacrylate, distilling at 60°–70° C./0.7 mm.

To the aqueous layer there was added hydrochloric acid until the layer was distinctly acidic. An organic layer formed and was separated after it had been taken up in ether. The ether solution was dried over a calcium sulfate drying agent and subjected to distillation. After the ether had been stripped off, a fraction was obtained at 63°–76° C./2.5 mm. which corresponded approximately in composition to ethyl 2-hydroxymethylene-4-pentenoate. This fraction was redistilled and the fraction coming over at 46°–47° C./1 mm. was collected. It had a refractive index, $n_D^{20}$, of 1.4565 and a density, $$d_{20}^{20}$$

of 1.040. It contained by analysis 61.83% of carbon and 7.85% of hydrogen, compared to theoretical values for ethyl 2-hydroxymethylene-4-pentenoate of 61.51% and 7.74% respectively.

There may similarly be prepared methyl beta-alloxyacrylate, propyl beta-chloroalloxyacrylate, butyl beta-chloroalloxyacrylate, or other alkyl beta-alloxyacrylate, which may in turn be rearranged by heating to an alkyl 2-hydroxymethylene-4-pentenoate, as above. Typical of these is the following preparation.

EXAMPLE 2

*(a) Preparation of methyl beta-alloxyacrylate*

A mixture of 116 grams of methyl beta-methoxyacrylate, 108 grams of allyl alcohol, and 0.1 gram of sodium hydrogen sulfate was heated in a reaction vessel carrying a packed distillation column. When the reaction mixture reached a temperature of about 80° C., methyl alcohol began to be evolved. It was taken off at overhead temperatures of 64° to 67° C., while the pot temperature was carried above 100° C. The reaction mixture was then subjected to distillation through a two-foot column under reduced pressure. Excess allyl alcohol was taken off. There was then obtained a fraction of 56 grams, distilling at 57°–63° C./2–4 mm. This fraction had a refractive index, $n_D^{20}$, of 1.4675, molecular refraction, $MR_D$, of 37.43, a density, $$d_{20}^{20}$$

of 1.054, and a saponification equivalent of 145. Theoretical values for methyl beta-alloxyacrylate ($C_7H_{10}O_3$) are for $MR_D$, 36.89, and for saponification equivalent, 142.

Continued distillation yielded 60 grams of a mixture of methyl beta-alloxyacrylate and allyl beta-alloxyacrylate distilling at 68°–85°C./3–2 mm.

*(b) Rearrangement of methyl beta-alloxyacrylate to methyl 2-hydroxymethylene-4-pentenoate*

A portion of the above methyl beta-alloxyacrylate was heated at 150° C. for three and one-half hours. The reaction mixture was then distilled and four grams of an oil obtained at 40°–45° C./2–3 mm. which corresponded approximately in composition to methyl 2-hydroxymethylene-4-pentenoate.

In the following example there is used crotyl alcohol as typical of the 2,3-unsaturated alcohols, $R^1CH=C(R^2)CH_2OH$ wherein $R^1$ is a hydrocarbon group and $R^2$ is hydrogen. As will be seen, the $R^1$ group appears in the pentenoate in the 3-position thereof. In this particular case $R^1$ will be methyl, but the same reaction is obtained when $R^1$ is ethyl, propyl, or butyl, or phenyl, in each case the $R^1$ hydrocarbon group appearing in the rearranged ester in the 3-position.

The following example illustrates another phase of the reactions here-involved, the use of diether propionates as starting materials and their conversion to ether acrylates as part of the course of the chemical changes leading to the 2-hydroxymethylene-4-pentenoates.

EXAMPLE 3

*(a) Preparation of ethyl beta-crotoxyacrylate*

A mixture of 158 grams of ethyl beta,beta-diethoxypropionate, 60 grams of crotyl alcohol, and 200 ml. of toluene was treated with 0.1 gram of sodium acid sulfate and heated in a reaction vessel carrying a two and a half foot column. There were obtained 100 grams of an ethanol-toluene azeotrope which distilled at 74°–78° C. and a fraction of 30 grams of ethanol and toluene which distilled at 78° to 105° C. The amount of ethanol taken off was 85 grams (theory for displacement of the ethoxy groups is 75 grams).

Distillation was continued under reduced pressure. At 35°–40° C./40 mm. a fraction consisting of toluene was taken off. Between 50° and 71° C./1 mm. there were obtained 55 grams of a mixture of toluene, ethyl beta-ethoxyacrylate, and ethyl beta-crotoxyacrylate. There was then obtained at 71° C./0.9 mm. a fraction of 56 grams of ethyl beta-crotoxyacrylate. It had a refractive index, $n_D^{20}$, of 1.4619 and a saponification equivalent of 172. It contained by analysis 63.75% of carbon and 8.45% of hydrogen. Theoretical values for ethyl beta-crotoxyacrylate are 63.51% for carbon content, 8.28% for hydrogen content, and 170 for saponification equivalent.

After the above fraction was obtained, there was distilled at 71°–94° C./0.9 mm. a fraction which was found to be a mixture of ethyl beta-crotoxyacrylate and crotyl beta-crotoxyacrylate.

(b) *Rearrangement to ethyl 2-hydroxymethylene-3-methyl-4-pentenoate*

A portion of 80 grams of ethyl beta-crotoxyacrylate was placed in a flask and heated for 40 minutes at 160°–170° C. The contents of the flask were cooled to 10° C. and stirred at 10° C. for 15 minutes with a solution of 30 grams of sodium hydroxide in 270 grams of water. The resulting mixture appeared homogeneous. It was extracted with two 50 ml. portions of ethyl ether. Evaporation of the ether extracts left no residue. The aqueous layer was acidified with dilute hydrochloric acid and an organic layer formed. It was taken up in ether and separated. The water layer was extracted several times with small portions of ether, which were combined with the main organic portion. The combined ether extracts were dried over calcium sulfate and distilled. After removal of ether there was obtained a main fraction which distilled at 40°–75° C./1 mm. This fraction was redistilled at 60°–68° C./1 mm. The product had a refractive index, $n_D^{20}$, of 1.4490. It had by analysis a carbon content of 63.47% and a hydrogen content of 8.31% corresponding to ethyl 2-hydroxymethylene 3-methyl-4-pentenoate, for which the theoretical carbon content is 63.51% and hydrogen content is 8.28%.

(c) *Decarbonylation of ethyl 2-hydroxymethylene-3-methyl-4-pentenoate*

A portion of 30 grams of ethyl 2-hydroxymethylene-3-methyl-4-pentenoate was treated with one gram of sodium and heated in a flask connected to a wet-test gas meter. With pot temperatures from 145° to 173° C. there was evolved 2.53 liters of carbon monoxide. The reaction mixture was cooled and poured into water. The resulting mixture was extracted with ethyl ether. The extract was dried over anhydrous potassium carbonate and distilled. After the ether had been removed, there were obtained at 44°–47° C./8 mm. 10 grams of a liquid which had a refractive index $n_D^{20}$, of 1.4168 and a saponification equivalent of 143. It contained by analysis 67.32% of carbon and 9.92% of hydrogen, corresponding in composition to ethyl 3-methyl-4-pentenoate, for which the saponification equivalent is 142 and which has a theoretical carbon content of 67.58% and hydrogen content of 9.91%.

The following example demonstrates the use of a relatively large group and of a phenyl group as $R^1$ in the unsaturated alcohol.

EXAMPLE 4

(a) There was heated in a reaction vessel equipped with a distilling column two feet high a mixture of 144 grams of ethyl beta-ethoxyacrylate, 140 grams of cinnamyl alcohol, 100 ml. of toluene, and 0.1 gram of sodium hydrogen sulfate. There was taken off at 74°–78° C. an azeotrope of ethanol and toluene in an amount of 53 grams. Between 78° and 110° C. there was taken off a mixture of 7 grams of ethanol and toluene. The pot temperature was then raised to 205° C. to strip off the rest of the toluene. Distillation was continued under reduced pressure. Between 55° C. and 126° C./1 mm. there was obtained cinnamyl alcohol, ethyl beta-ethoxyacrylate, and ethyl beta-cinnamoxyacrylate totalling 67 grams. There was then obtained a fraction distilling at 126°–175° C./1 mm. which consisted of ethyl beta-cinnamoxyacrylate (86%) and ethyl 2-hydroxymethylene-3-phenyl-4-pentenoate (14%), as determined by titration.

The residue was distilled from a Von Braun flask and at 180°–220° C./1 mm. a fraction was obtained which consisted of cinnamyl beta-cinnamoxyacrylate (88%) and cinnamyl 2-hydroxymethylene-3-phenyl-4-pentenoate (12%).

(b) When these fractions were heated at 170°–200° C., they steadily increased in acidity as the beta-ether acrylate was rearranged to the 2-hydroxymethylene 3-phenyl-4-pentenoates in each case. The final products were ethyl 2-hydroxymethylene-3-phenyl-4-pentenoate and cinnamyl 2-hydroxymethylene-3-phenyl-4-pentenoate respectively.

In the next two examples the use of a 2-substituent in the 2,3-unsaturated alcohol is shown. This substituent may be a halogen, such as chlorine or bromine, or a hydrocarbon group, such as an alkyl group or a phenyl group.

EXAMPLE 5

(a) *Preparation of ethyl beta-chloroalloxyacrylate*

A mixture of 190 grams of ethyl beta,beta-diethoxypropionate, 139 grams of beta-chloroallyl alcohol, $CH_2=CClCH_2OH$, 300 ml. of toluene, and two grams of sodium hydrogen sulfate was heated in a reaction vessel equipped with a column one foot in height. There was taken off at overhead temperatures of 76°–80° C. an azeotrope of ethanol and toluene, containing 78 grams of ethanol. The mixture was then subjected to distillation at reduced pressure. A fraction of 273 ml. of toluene was distilled at 40° C./40 mm. and then a fraction of 35 grams of chloroallyl alcohol was taken off at 50°–62° C./2 mm. The next fraction, distilled at 45°–80° C./1 mm., was found to consist of ethyl beta-ethoxyacrylate and ethyl beta-chloroalloxyacrylate. There was distilled at 80°–87° C./1 mm. a fraction of 86 grams of ethyl beta-(beta'-chloroalloxy) acrylate. It had a refractive index, $n_D^{20}$, of 1.4800 and contained according to analysis 50.12% of carbon, 5.99% of hydrogen, and 18.65% of chlorine. The theoretical values for ethyl beta-(beta'-chloroalloxy)acrylate are 50.39%, 5.82%, and 18.62% respectively.

A final fraction of 35 grams was distilled at 87°–117° C./1 mm. It was a mixture of ethyl beta-chloroalloxyacrylate and chloroallyl beta-chloroalloxyacrylate.

(b) *Rearrangement of ethyl beta-chloroalloxyacrylate*

A portion of 40 grams of ethyl beta-(beta'-chloroalloxy)acrylate was heated at 150°–190° C. for ten minutes and then subjected to distillation under reduced pressure. A fraction of 25 grams was taken off at 45°–160° C./1 mm. This was extracted with 100 ml. of a 10% sodium hydroxide solution and then with 100 ml. of a 5% sodium hydroxide solution. The organic liquid which was separated was unconverted ethyl beta-(beta'-chloroalloxy)acrylate in an amount of 12 grams. The aqueous layer was rendered acidic with hydrochloric acid solution and extracted with ethyl ether. The extracts were dried over a calcium sulfate drying reagent and distilled. After removal of ether there was obtained a fraction of five grams of ethyl 4-chloro-4-pentenoate, which distilled at 60°–90° C./1 mm. and had a refractive index, $n_D^{20}$, of 1.4798.

The above procedures were followed in trans-etherifying butyl beta,beta-dibutoxypropionate with beta-chloroallyl alcohol to yield butyl beta-(beta'-chloroalloxy)acrylate, which was in turn heated at about 190° C. to cause rearrangement. The final product was butyl 4-chloro-4-pentenoate distilling at 80°–100° C./1 mm.

EXAMPLE 6

*Preparation of methallyl 4-methyl-4-pentenoate and methallyl 2-hydroxymethylene-4-methyl-4-pentenoate*

A mixture of 144 grams of ethyl beta-ethoxyacrylate, 170 grams of methallyl alcohol in which 5 grams of sodium had been dissolved, and 200 grams of toluene was heated in a reaction vessel equipped with a two-foot packed column. There was taken off an ethanol-toluene azeotrope (140 grams) at overhead temperatures of 76° to 85° C. with the pot temperature reaching 125° C. The reaction mixture was cooled and poured into water. The mixture was rendered acidic and the organic layer separated, washed with brine, dried, and distilled. After toluene had been removed, the remaining liquid was heated at 70° to 170° C. and distilled with overhead temperatures of 40° to 140° C./1 mm. to give a fraction of 134 grams. This fraction was washed with 200 ml. of a cold aqueous solution containing 10% of sodium hydroxide. The aqueous and organic layers were separated, the organic layer was dried over anhydrous potassium carbonate and distilled under reduced pressure. A fraction of 12 grams was obtained at 32°–40° C./1 mm. It had a refractive index of 1.4444 and corresponded in composition to methallyl 4-methyl-4-pentenoate.

This fraction was redistilled at 80° C./9 mm. It then had a refractive index of 1.4438, a density, $$d_{20}^{20}$$

of 0.9103, a molecular refraction, $MR_D$, of 49.08 and a saponification equivalent of 169. Theoretical values are 49.10 for molecular refraction and 167 for saponification equivalent.

There was also obtained 42 grams of methallyl beta-methalloxyacrylate, which distilled at 40°–85° C./1 mm. and had a refractive index, $n_D^{20}$, of 1.4714. There was further obtained a fraction of 29 grams, distilling at 85°–90° C./1 mm. which was identified as methallyl beta,beta-di(methalloxy)propionate.

The aqueous layer from the sodium hydroxide wash was rendered acidic with dilute hydrochloric acid and extracted with ethyl ether several times. The extracts were combined, dried, and distilled. After the ether had been taken off, the product (10 grams) distilled at 64°–66° C./1 mm. It was identified as methallyl 2-hydroxymethylene-4-methyl-4-pentenoate.

The above procedure was followed with five times the quantities of materials used above. Higher temperatures were used, however, during the removal of ethyl alcohol, the pot temperature being 175° C. During the heating the ethyl groups were completely replaced with methallyl groups. The methallyl beta-methalloxyacrylate was rearranged to methallyl 2-hydroxymethylene-4-methyl-4-pentenoate. This was decarbonylated and 66.5 liters of gas were driven off, 77% of which was determined to be carbon monoxide. The product was purified by distillation at 80° C./9 mm. and amounted to 675 grams of pure methallyl 4-methyl-4-pentenoate.

The reactions involved may be represented as follows:

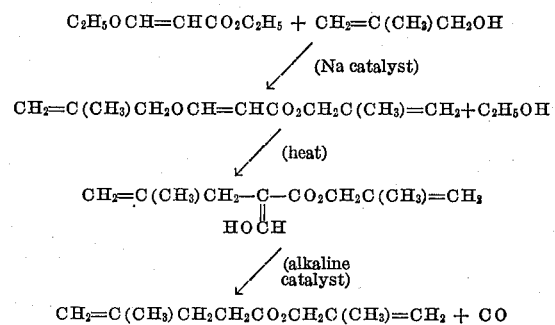

EXAMPLE 7

*(a) Preparation of allyl beta-alloxyacrylate and beta,beta,di(alloxy)propionate*

A mixture of 95 grams of ethyl beta,beta-diethoxypropionate, 200 ml. of toluene, and 63 grams of allyl alcohol in which there had been dissolved 1.5 grams of metallic sodium was heated in a reaction vessel equipped with a two-foot column. There were taken off 90 grams of a toluene-ethanol azeotrope at 78°–80° C. and 30 grams of a toluene-allyl alcohol mixture at 80°–92° C. The pot temperature reached 120° C. The reaction mixture was cooled to room temperature and poured into water. The resulting mixture was neutralized with acid. The organic layer was taken up with ethyl ether to assist in its separation and the aqueous layer extracted with ether. The organic layer and ether extract were combined, dried, and distilled. After the ether had been removed, there were obtained between 88° and 115° C. at 10 mm. with pot temperatures of 110° to 135° C. 37 grams of a mixture of allyl beta-alloxyacrylate and allyl beta,beta-dialloxypropionate.

These products are also obtainable by the direct reaction of diallyl carbonate and acetylene. For example, 213 grams of allyl alcohol was treated with five grams of sodium in small pieces. When the sodium had all dissolved, excess allyl alcohol was distilled off under reduced pressure. Thereto was added 246 grams of diallyl carbonate. The apparatus was flushed with nitrogen and the batch was maintained at 80°–85° C. while acetylene was pressed in at 10 inches mercury pressure. When acetylene was no longer taken up, the batch was cooled, rendered acid by addition of acetic acid (23%) solution. An oil layer formed and was separated. It was fractionally distilled under reduced pressure. At 103°–120° C./4 mm. a mixture of allyl beta-alloxyacrylate and allyl beta,beta-dialloxypropionate was obtained. Careful refractionation gave a separation of these products.

(b) *Rearrangement reaction of allyl beta-alloxyacrylate and beta,beta-dialloxy propionate as obtained above*

The mixture was taken up in 100 ml. of toluene and 0.05 gram of sodium acid sulfate added thereto. The mixture was then heated under reflux for an hour and then distilled. Toluene and allyl alcohol were taken off. There was then obtained by distillation 20 grams of product which consisted of 60% of allyl 2-hydroxymethylene-4-pentenoate and 40% of allyl beta-alloxyacrylate, as determined by analysis.

EXAMPLE 8

*Preparation of allyl 2-hydroxymethylene-4-pentenoate*

There were mixed 432 grams of ethyl beta-ethoxyacrylate and 360 grams of allyl alcohol in a reaction vessel equipped with a 3.5-foot column which was connected to a wet test gas meter. The mixture was heated to reflux and a solution of sodium ethoxide formed by dissolving five grams of sodium in 67 grams of ethanol was introduced in small increments. Ethanol and allyl alcohol were distilled from the mixture and the temperature of the liquid in the reaction vessel was carried up to 172° C. There were taken off 18.9 liters of carbon monoxide. The liquid was then distilled under reduced pressure. A distillate of 326 grams was obtained at 50°–123° C./1 mm. A tarry residue of 148 grams remained. The distillate was fractionated through a packed column. At 36°–74° C./40 mm. a fraction of 46 grams was obtained. It had a refractive index, $n_D^{20}$, of 1.4140 and corresponded by composition to ethyl 4-pentenoate. A 165-gram fraction distilled at 69°–73° C./20 mm., had a refractive index of 1.4350, and proved to be allyl 4-pentenoate. There was obtained at 62° C./5 mm. to 85° C./1 mm. 69 grams of a mixture of allyl 4-pentenoate and allyl 2-hydroxymethylene-4-pentenoate.

EXAMPLE 9

*Preparation of allyl 4-pentenoate*

The general procedure of Example 8 was followed except that there was used a solution of four grams of sodium in allyl alcohol. During the course of heating a total of 424 grams of ethanol and allyl alcohol were taken off. The pot temperature was 173° C. The reaction mixture was then distilled at atmospheric pressure. There was obtained at 163°–168° C. a distillate of 285 grams. During the first stage 25.6 liters of carbon monoxide were evolved and during the distillation another 5.3 liters were collected. The pot temperatures during distillation rose from 175° to 206° C. The distillate was fractionated through a packed column. At 50°–70° C./30 mm. there were obtained 5 grams of ethyl 4-pentenoate and at 68° C./28 mm. there were collected 258 grams of allyl 4-pentenoate.

The formation of an ester of 2-hydroxymethylene-4-pentenoic acid and of the acylated product thereof, the preparation of the free 2-hydroxymethylene-4-pentenoic acid, and its decarboxylation are illustrated in the examples which follow.

EXAMPLE 10

(a) A mixture of 197 grams of ethyl beta-alloxyacrylate and 255 grams of acetic anhydride (90% anhydride content) was heated in a reaction vessel carrying a four-foot, glass helices-packed column. A forerun of 15 grams was taken from the column at 60°–115° C. There was then obtained acetic acid at 118°–125° C. in an amount of 76 grams with the pot temperatures at 150°–170° C. The system was subjected to reduced pressure and excess acetic anhydride distilled out. There was then obtained at 102°–108° C./2–3 mm. 170 grams of ethyl 2-acetoxymethylene-4-pentenoate.

(b) A portion of 99 grams of ethyl 2-acetoxymethylene-4-pentenoate was heated with a solution of 50 grams of sodium hydroxide in 250 ml. of water under reflux. The mixture was cooled, washed with ether, and acidified. The oil which then formed was extracted and separated with ethyl ether. The ether solution was dried over calcium sulfate and subjected to distillation. After the ether had been stripped off, a forerun of nine grams was obtained at 20° C./1 mm. A fraction of 35 grams was obtained at 46°–56° C./1 mm. This had a density, $$d_{20}^{20}$$

of 1.021 and corresponded in composition to 2-hydroxymethylene-4-pentenoic acid.

(c) Twenty-five grams of 2-hydroxymethylene-4-pentenoic acid were heated in a flask, the outlet of which was connected through a receiver to a bottle containing sodium hydroxide solution and to a gas-collecting bottle. When the pot temperature reached 130° C., gas was evolved. With pot temperatures of 130°–210° C. 16 grams of a liquid was distilled. It had a refractive index of 1.4190–1.4200. A 6.5-gram portion was redistilled and a 4-gram portion, distilling at 103°–109° C., was collected. It yielded a crude 2,4-dinitrophenylhydrazone which melted at 113°–114° C. and corresponded in composition to allylacetaldehyde. Literature value for the melting point of this hydrazone is 120° C. and for the refractive index, $n_D^{20}$, it is 1.4191.

EXAMPLE 11

(a) *Preparation of 2-hydroxymethylene-4-pentenoic acid*

A solution of 78 grams (0.5 mole) of ethyl 2-hydroxymethylene-4-pentenoate in 250 grams of 20% sodium hydroxide solution (1.3 moles) was heated under reflux for five minutes, cooled, and acidified. The resulting organic material was removed by extraction with ether, dried over anhydrous magnesium sulfate, and distilled. After removal of ether, there was obtained 33 grams (52% yield) of 2-hydroxymethylene-4-pentenoic acid which boiled at 46–56° C./1 mm. On redistillation, it boiled at 46°–50° C./1 mm., had a refractive index, $n_D^{20}$, of 1.4493, a density, $$d_{20}^{20}$$

of 1.021, and a molecular refraction, $MR_D$, of 33.66. For 2-hydroxymethylene-4-pentenoic acid the theoretical value of $MR_D$ is 32.04.

(b) *Preparation of allylacetaldehyde*

Thirty grams (0.23 mole) of 2-hydroxymethylene-4-pentenoic acid was heated at 130°–210° C. in a Claisen flask, the outlet of which led through a sodium hydroxide solution. There was obtained on distillation 16 grams (90% yield) of liquid while seven grams (0.16 mole) of carbon dioxide was collected in the alkali trap. On redistillation the liquid boiled at 103°–109° C., had a refractive index, $n_D^{20}$, of 1.4163, a density, $$d_{20}^{20}$$

of 0.863, and formed a 2,4-dinitrophenylhydrazine derivative in 60% yield which melted at 116°–117.5° C. The product contained by analysis C=50.21% and H=4.38%.

We claim:

1. A process which comprises rearranging by heating at 150° to 250° C. an ester of the formula $$R^1CH=C(R^2)CH_2OCH=CHCOOR$$

wherein R is a non-tertiary hydrocarbon group and $R^1$ and $R^2$ are members of the class consisting of hydrogen, chlorine, bromine, the phenyl group, and alkyl groups of not over four carbon atoms.

2. A process which comprises rearranging by heating between 150° to 200° C. an ester of the formula $$R^1CH=C(R^2)CH_2OCH=CHCOOR$$

and separating an ester of the formula $$CH_2=C(R^2)CH(R^1)-\underset{H\overset{\|}{C}OH}{C}-COOR$$

wherein $R^1$ and $R^2$ are members of the class consisting of hydrogen, chlorine, bromine, the phenyl group, and alkyl groups of not over four carbon atoms, and R is an alkyl group of not over eight carbon atoms.

3. A process which comprises heating at 150° to 200° C. ethyl beta-alloxyacryate and separating ethyl 2-hydroxymethylene-4-pentenoate.

4. A process which comprises heating at 150° to 200° C. ethyl beta-crotoxyacrylate and separating ethyl 2-hydroxymethylene-3-methyl-4-pentenoate.

5. A process which comprises heating at 150° to 200° C. methallyl beta-methalloxyacrylate and separating methallyl 2-hydroxymethylene-4-methyl-4-pentenoate.

6. As a new chemical substance, a compound of the formula $$CH_2=C(R^2)CH(R^1)-\underset{H\overset{\|}{C}OH}{C}-COOR$$

wherein R is a non-tertiary aliphatic hydrocarbon group of not over four carbon atoms, $R^1$ is a member of the class consisting of hydrogen, the methyl group, and the phenyl group, and $R^2$ is a member of the class consisting of hydrogen, chlorine, and the methyl group, at least one of the groups $R^1$ and $R^2$ being hydrogen.

7. As a new chemical substance, ethyl 2-hydroxymethylene-4-pentenoate.

8. As a new chemical substance, ethyl 2-hydroxymethylene-3-methyl-3-pentenoate.

9. As a new chemical substance, methallyl 2-hydroxymethylene-4-methyl-4-pentenoate.

WILLARD J. CROXALL.
JOHN O. VAN HOOK.

No references cited.